United States Patent [19]
Fogelberg

[11] 3,838,610
[45] Oct. 1, 1974

[54] PLANETARY DIFFERENTIAL FOR FOUR WHEEL DRIVE WITH AUTOMATIC LOCKING GEAR

[75] Inventor: Mark J. Fogelberg, Muncie, Ind.

[73] Assignee: Borg-Warner Corporation, Chicago, Ill.

[22] Filed: July 18, 1973

[21] Appl. No.: 380,444

[52] U.S. Cl............... 74/711, 74/710.5, 74/752 R, 74/773
[51] Int. Cl.......................... F16h 1/44, F16h 57/10
[58] Field of Search.......... 74/711, 710.5, 713, 714, 74/752 F, 752 BR, 753, 772, 773; 180/44 R, 24.09

[56] References Cited
UNITED STATES PATENTS

| | | | |
|---|---|---|---|
| 3,095,758 | 7/1963 | Bixby | 74/740 X |
| 3,378,093 | 4/1968 | Hill | 74/710.5 X |
| 3,557,634 | 1/1971 | Bixby | 74/710.5 |
| 3,605,523 | 9/1971 | O'Brien | 74/711 |
| 3,627,072 | 12/1971 | Smirl | 74/711 X |
| 3,650,349 | 3/1972 | Cleveland et al. | 74/711 X |
| 3,656,573 | 4/1972 | Halberg | 74/711 X |

Primary Examiner—Samuel Scott
Assistant Examiner—Lance W. Chandler
Attorney, Agent, or Firm—James A. Geppert

[57] ABSTRACT

A planetary differential mechanism suitable for use in a multiple path drive system including planet gears, a pair of gear elements and a locking gear meshing with one of the gear elements and adapted to mesh with one of the planet gears. The differential is arranged such that during normal operation one of the gear elements normally overspeeds the other and camming means holds the locking gear out of contact with the planet gear, but when the normally underspeeding gear element overspeeds the normally overspeeding gear element, the camming means allows the locking gear to mesh with a planet gear and prevents differentiation between the gear elements.

15 Claims, 7 Drawing Figures

PLANETARY DIFFERENTIAL FOR FOUR WHEEL DRIVE WITH AUTOMATIC LOCKING GEAR

BACKGROUND OF THE INVENTION

This invention relates to planetary differential mechanisms and, more particularly, to a planetary differential incorporating a lockup feature, actuable when one predetermined gear element overspeeds the other, to prevent differentiation between the gear elements. The particular planetary differential disclosed is adapted for use in a torque transfer mechanism which can be used as a center differential in a four wheel drive system. The differential receives an input torque from a prime mover and distributes the same to a plurality of drive axles.

It is well recognized in the art that the tractive efforts of a vehicle are substantially improved if driving torque is applied to more than one axle. This concept underlies the employment of known four wheel drive systems in military vehicles or vehicles intended for operation over unimproved terrain. However, certain problems arise in the provision of known four wheel drive systems which have thus far precluded their employment in pneumatic tired commercial and passenger vehicles.

If all four wheels are positively driven by the engine, a severe amount of tire scrape or cornering scrub occurs as the vehicle negotiates curves or turns. Under such conditions, the front wheels must run through an arc of greater radius than the rear wheels. Further, in such a system, slight differences in effective wheel radii, caused by inevitable differences in tire inflation, tread wear, or the like, result in the occurrence of what is known as circumferential scrub. Under such conditions, the wheels having smaller radii necessarily tend to rotate faster than those having larger radii while traversing the same distance. If front and rear axles are positively locked together, one set of tires will be scraped over the ground. Tires will not long withstand such abuse. In addition, undue stress and windup occurs in the drive train and fuel consumption is excessive.

One approach to solving the problems inherent in such a system has been to provide a manually operable clutch or disengageable gear, enabling the front wheels of the vehicle to be selectively engaged or disengaged for positive drive effort. Thus, the front wheels would only be locked into engagement for four wheel drive when surface conditions would permit. Such engagement would normally occur when the vehicle was traveling on unpaved surfaces.

Much effort has been devoted to providing a third or center differential in a four wheel drive system for splitting torque received from an engine such that front and rear drive shafts would serve respectively to drive front and rear axles through appropriate differentials. Such a differential permits overspeeding of any one or more of the drive axles for the previously mentioned circumstances. If the center differential is uninhibited and if one set of wheels should lose traction with the road surface as on ice or the like, these wheels will spin freely and the differential will cause the other set of wheels to exert no driving torque.

Manually operable locking means have been incorporated into such differentials which, when engaged, eliminate differential action between the drive shafts and positively lock the driven parts together. These are, however, inherently so limited in effectiveness that they have never found any commercial acceptance.

Other four wheel drive systems have been proposed which incorporate a center differential which will automatically provide for inhibiting differential action whenever limited free ranges of differential action are exceeded. Such devices are operative to automatically restore such action when the tendency to exceed the ranges ceases. One such device is shown and described in U.S. Pat. No. 2,796,941 issued to Claude Hill. As will be apparent, however, such a system results in a mechanism which is both costly and cumbersome.

Another approach has been to utilize, as a center of third differential, a limited slip differential of the bevel gear, cone-clutch type, pre-loaded to an engaged condition, having an input driven by the vehicle engine and a pair of output shafts each of which is adapted to be connected to a drive axle. Such a device is shown and described in U.S. Pat. application, Ser. No. 867,995 filed Oct. 21, 1969.

SUMMARY OF THE INVENTION

The present invention provides a differential mechanism of the planetary gear type, adapted for use as a center or third differential in a multiple path drive system. The differential receives an input torque from a prime mover and divides the torque between a pair of output shafts each of which are connected to one drive axle. The planetary differential includes a planetary carrier, at least one planet gear and a ring gear and a sun gear which are referred to as gear elements. The differential also includes a locking gear meshing with either the sun gear or the ring gear and adapted to mesh with the planet gear. The differential is oriented such that one of the gear elements normally overspeeds the other. Camming means and a link carrying the locking gear cooperate to hold the locking gear out of engagement with the planet gear to allow differential between sun gear and ring gear during normal overspeed of the one gear element ith respect to the other but are actuable when the normally underspeeding gear element overspeeds the normally overspeed gear element to allow the locking gear to mesh with the planet gear and to cause a lockup of the differential and prevent differential between the sun and ring gear.

DESCRIPTION OF THE PREFERRED EMBODIMENT

Figure 1:
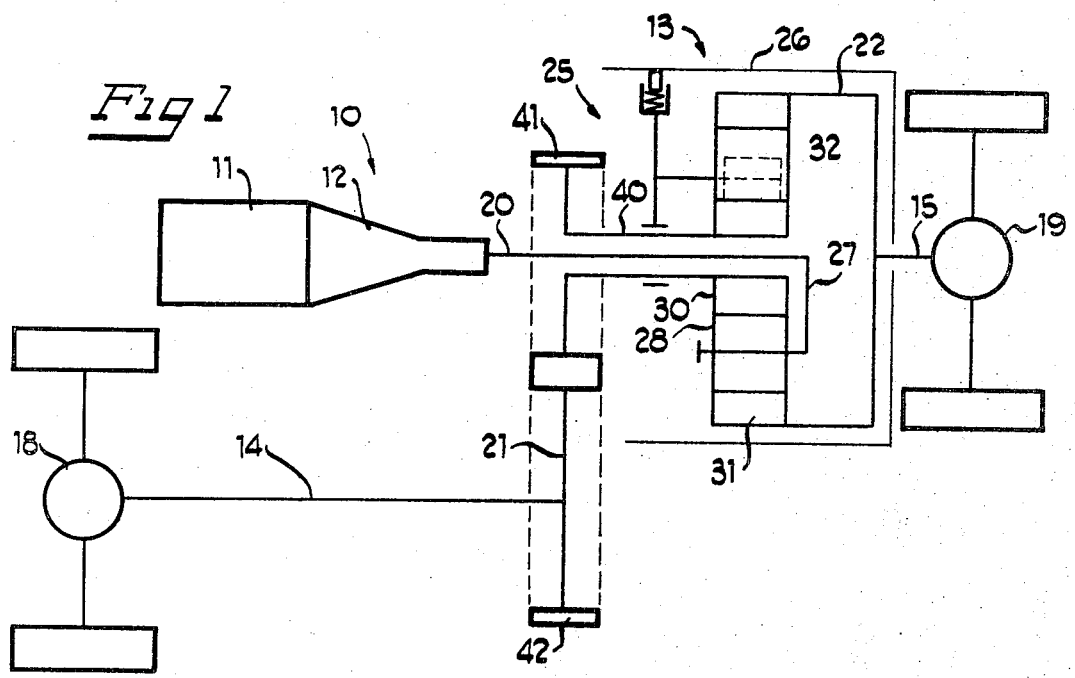
FIG. 1 is a schematic of a four wheel drive system including a torque transfer mechanism which incorporates a planetary differential of the present invention.

As best illustrated in FIG. 1 a four wheel drive system 10 is shown for driving a motor vehicle. The system 10 includes a prime mover 11, generally an internal combustion engine, a transmission 12 driven by the engine 11, a torque transfer mechanism 13 driven by the transmission 12, a pair of drive shafts 14 and 15 driven by the torque transfer mechanism 13 and a pair of drive axles 18 and 19 driven respectively by the drive shafts 14 and 15. The drive axle 18 represents the front drive of the vehicle and the axle 19 represents the rear drive. The drive axles 18 and 19 may each incorporate a differential mechanism which may be either of the uninhibited type or of the limited slip type.

The torque transfer mechanism 13 includes an input shaft 20 driven by the transmission 12, a pair of outputs 21 and 22 and a differential mechanism 25 drivingly connected between the input 20 and the outputs 21 and 22. The outputs 21 and 22 are respectively connected to drive shafts 14 and 15.

Figure 2:
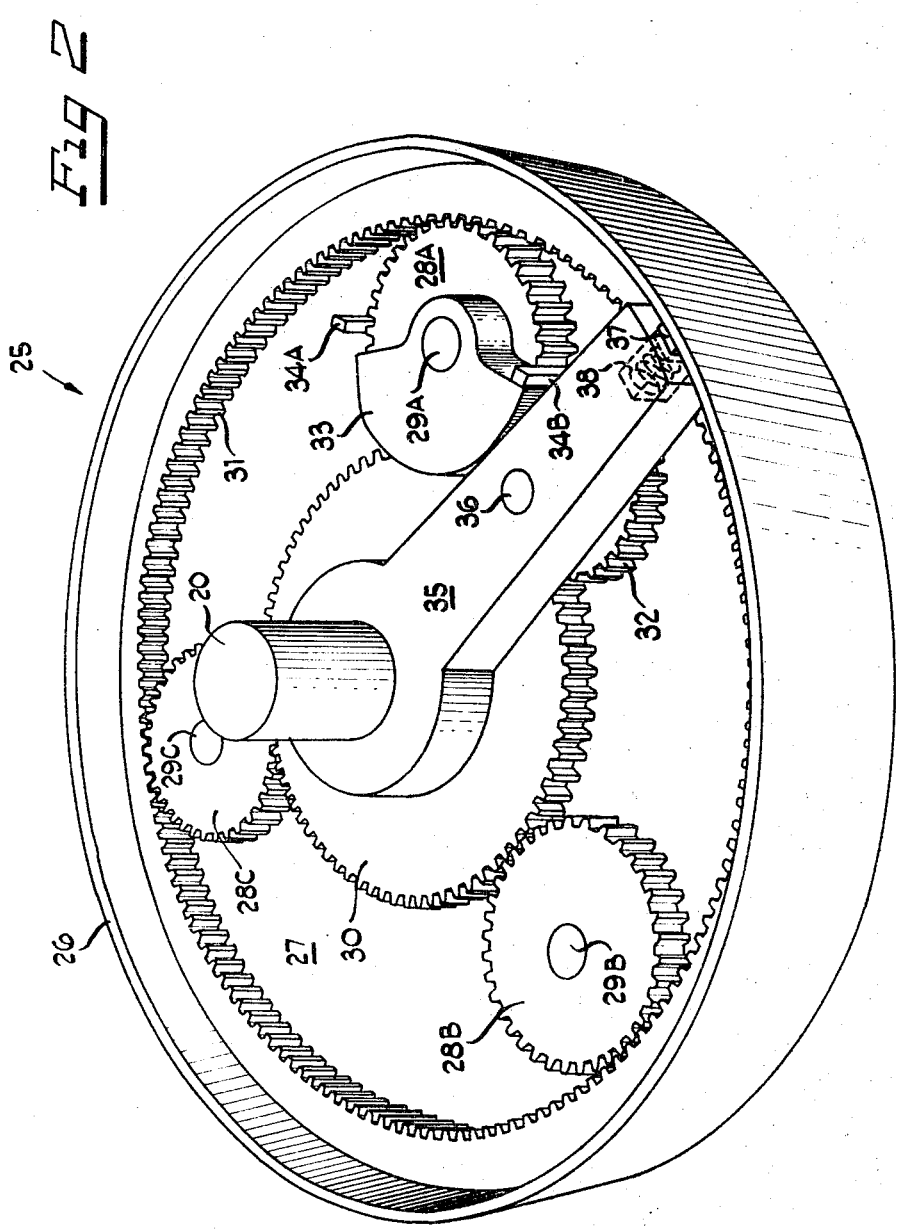
FIG. 2 is a perspective view of one embodiment of the differential of the present invention.

The preferred embodiment of the differential mechanism 25, as best illustrated in FIGS. 1 and 2, includes a housing 26, a planet carrier element 27 driven by the input shaft 20, at least one but preferably a plurality of planet gears 28A, 28B and 28C carried by the planet carrier 27, a pair of gear element 30 and 31, respectively designated as a sun gear and a ring gear and meshed with the planet gears 28 and a locking gear 32 meshed with one of said gear elements here shown as the sun gear 30 and adapted to mesh with the planet gear 28A. The planet gears 28 are mounted on pins 29 which are carried by the planet carrier 27.

The differential mechanism 25 also includes a link 35 journalled for rotation about and relative to the input shaft 20. The link 35 carries the locking gear 32, which is mounted for rotation thereon by means of pin 36, and holds the locking gear 32 in meshing engagement with the sun gear 30. The link 35, at its outer extremity, carries a friction member 37 adapted to frictionally engage the housing 26. The friction member 37 is shown biased into engagement with the housing 26 by a spring 38.

Camming means 33 is shown rotatably mounted on the pin 29A. A friction connection is established between the planet gear 28A and the camming means 33 such the camming means will be urged to rotate about the pin 29A in the same direction of rotation as the planet gear. The friction connection can be accomplished in any of a number of well known ways, one method being to merely force the camming means 33 into contact with the gear 28A. The camming means 33 illustrated is a circular segment of greater diameter than the planet gear 28A but any of a number of shapes or forms could be used to accomplish the same results. A pair of stop pins 34A and 34B are carried by the carrier 27 and limit the rotation travel of the camming means 33 in either direction of rotation.

The sun gear 30 is affixed to a shaft 40 at one end of the shaft. A gear 41 is affixed to the shaft 40 at its other end. The output 21 includes a gear 42. A chain or belt 45 connects the gear 41 and the gear 42 for rotary drive therebetween. The output 22 is shown connected to the ring gear 31.

The differential mechanism illustrated in FIGS. 1 and 2 represents one preferred embodiment. It should be realized that any of a number of changes could be made which would not depart from the scope of the invention nor significantly affect the operation of the differential. The input shaft 20 is shown driving the planet carrier 27 but the differential could be rearranged so as to have the input shaft 20 driving either the sun gear 30 or the ring gear 31, with corresponding changes being made in the arrangement of the other differential elements.

OPERATION

The operation of the elements of the differential mechanism of the present invention are best illustrated in FIGS. 3, 4, 5 and 6.

Figure 3:
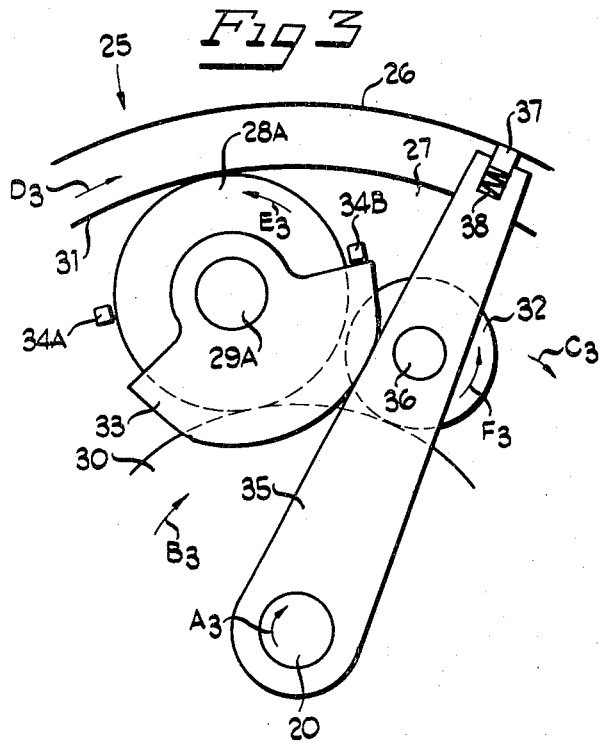
FIG. 3 is a top view in schematic of a portion of the differential mechanism showing the normal forward mode of operation.

FIG. 3 illustrates a portion of the differential mechanism 25 in its normal forward mode of operation in an unlocked condition. Means, not shown, are associated with the differential 25 to provide for normal overspeed of the sun gear 30 with respect to the ring gear 31. This could be accomplished in any of a number of ways. One arrangement for achieving this result would be to have the individual differential mechanisms of the drive axles 18 and 19 be of different numerical ratio such that for a given revolution of all four wheels the drive shaft 14 would travel through a greater arc than the drive shaft 15. The differential ratios may be adjusted to allow for any desired range of predetermined overspeed of one gear element with respect to the other.

For purposes of example, it will be assumed that the ratios are adjusted such that the sun gear 30 overspeeds the ring gear 31 by approximately 5 percent during the normal forward mode of operation.

The input shaft 20 is connected to the planet carrier 27 and both rotate in the same direction at the same angular speed or velocity. Arrows have been placed on the various rotational elements of the differential mechanism to indicate both the direction of rotation of each element and the relative rotational speed of that element with respect to the other elements of the differential. Longer arrows indicate relatively greater speed than shorter arrows.

Thus, as viewed in FIG. 3, since the input shaft 20 and the planet carrier 27 are connected to each other and rotate at the same angular velocity, arrow A is equal in length to arrow C. The planet gear 28A meshes with both the ring gear 31 and the sun gear 30. As the planet carrier 27 rotates clockwise, as shown in FIG. 3, the sun gear 30 rotates clockwise faster than the carrier 27 and the ring gear 31 rotates clockwise slower than the carrier 27. The sun gear 30 thus overspeeds the ring gear 31 by the previously predetermined percentage.

The locking gear 32 is held in meshing engagement with the sun gear 30 by the link 35. In the illustrated embodiment the locking gear 32 is smaller in diameter than the planet gear 28A. The link 35 which carries the locking gear 32 is frictionally engaged with the housing 26 and thus tends to retard any rotation of the link 35 about the central axis of the input shaft. The locking gear 32 rotates about its own axis, pin 36, in a counterclockwise direction but slower than the pinion gear 28.

Camming means 33, by virtue of its friction connection with planet gear 28A is urged to rotate in a counterclockwise direction about pin 29A until the camming means 33 abuts the stop pin 34B. At this point, the camming means is prevented from further counterclockwise rotation. The outer peripheral surface of the camming means 33 contacts the link 35 and maintains the locking gear 32 out of engagement with the planet gear 28A allowing free differentiation between the sun gear 30 and the ring gear 31. Differentiation is correspondingly allowed between the output 21 and the output 22 as long as the sun gear continues to overspeed the ring gear.

Figure 4:
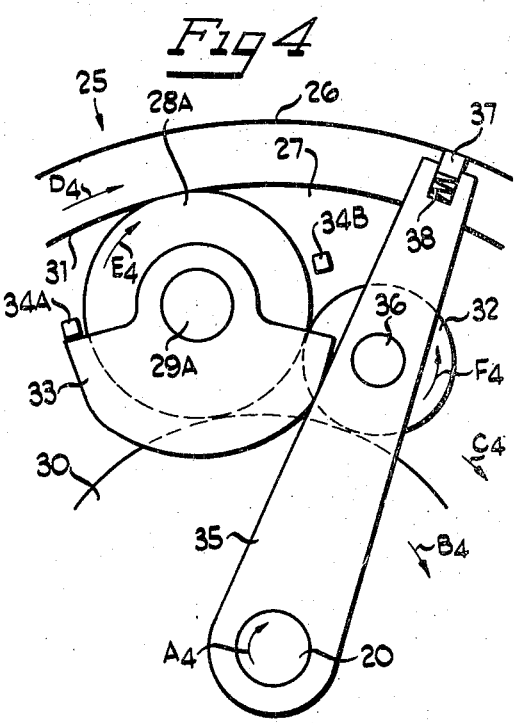
FIG. 4 is a top view in schematic of a portion of the differential mechanism showing the forward lockup mode of operation.

FIG. 4 illustrates the differential mechanism 25 of the present invention immediately prior to its forward locked condition. The direction and speed of rotation are the same as in FIG. 3 for input shaft 20, sun gear 30, planet carrier 27 and locking gear 32, as indicated by arrows A4, B4, C4 and F4. The direction of rotation of the ring gear 31 remains the same but the speed has increased until it slightly exceeds the rotational speed of the sun gear 30, thus causing the planet gear 28A to reverse its direction of rotation and begin to rotate clockwise as shown by the arrow E4. Since the planet gear 28A is now rotating clockwise and is frictionally engaged with the camming means 33, the camming means is now urged to rotate in a clockwise direction about the pin 29A until the camming means abuts the stop pin 34A which prevents further rotation of the camming means. This position of the camming means 33 places it out of contact ith the link 35 allowing the link and the locking gear to move closer to the planet gear 28A.

Since planet gear 28A and locking gear 32 are both in mesh with the sun gear 30 and are both rotating in opposite directions, the gears 28A and 32 are urged into engagement and lock thereby preventing any further differentiation between sun gear 30 and ring gear 31. The planet carrier 27 continues to rotate at the same speed as prior to lockup but the sun and ring gear now also rotate at the same speed as do outputs 21 and 22.

A vehicle condition which would simulate the differential condition shown in FIG. 4 would be as follows. Assume, looking at FIG. 1, that the individual differentials of front and rear axles 18 and 19 were arranged in a ratio relationship such that for normal forward operation the drive shaft 14 would normally overspeed the drive shaft 15. Because of the previously described connections the sun gear 30 would thus normally overspeed the ring gear 31 as shown in FIG. 3 and normal differentiation between the gear elements is permitted. If, for some reason, the rear wheels lose traction, the torque received by the input shaft 20 will result in acceleration of the output 22 and, consequently, the ring gear 31 to which it is attached. Such a condition could occur if the rear wheels encountered ice or mud or snow or any of a variety of other substances which would cause a loss of traction. For minor relative speed variations between the front and rear driving axles no effect will be seen on the differential since the built in relative overspeed is of the magnitude of 5 percent. Once, however, the rear drive axle exceeds the speed of the front drive axle by more than this predetermined percentage the ring gear 31 will overspeed the sun gear 30 causing a reversal in the direction of rotation of the planet gear 28A, as illustrated in FIG. 4 and consequent lockup of the differential due to engagement of the planet gear 28A, the locking gear 32 and the sun gear 30.

Figure 5:
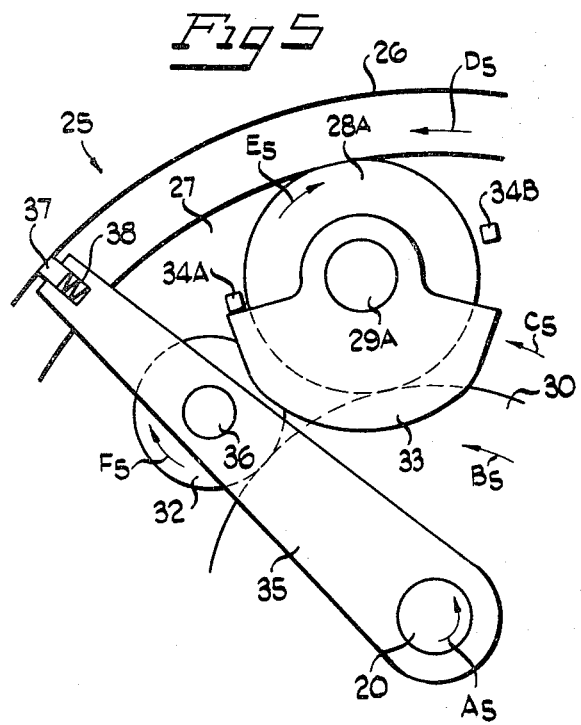
FIG. 5 is a top view in schematic of a portion of the differential mechanism showing the normal reverse mode of operation.

FIG. 5 illustrates the differential mechanism 25 of the present invention in its normal or unlocked condition when the vehicle is driven in reverse. In general, the operation is substantially the same as the operation described in FIG. 3.

The input shaft 20, planet carrier 27, sun gear 30, ring gear 31, planet gear 28 and locking gear 32 are rotating at the same angular speed as in FIG. 3 but in the opposite direction as indicated by arrows A5, B5, C5, D5, E5 and F5. Since the planet gear 28A is rotating clockwise the camming means 33 will rotate clockwise about the pin 29A until it abuts the pin stop 34A. Since the input shaft 20 and planet carrier 27 are now rotating counterclockwise the planet gear 28A will creep counterclockwise about the central axis of the input shaft 20 assuming a single planet gear arrangement from its position immediately to the left of the locking gear 32 as shown in FIG. 3 until the camming means 33 contacts the link 35 on its right hand side as shown in FIG. 5. The contact between the outer peripheral surface of the camming means 33 and the link 35 maintains the locking gear 32 out of engagement with the planet gear 28A allowing free differentiation between the sun gear 30 and the ring gear 31. The locking gear 32 will rotate about its own axis but will be urged against rotating about the input shaft by the friction engagement between the link 35 and the housing 26. The camming means 33 will urge the link 35 to rotate about the central axis of the input shaft 20 against the retarding force generated by its friction connection with housing 26.

Figure 6:
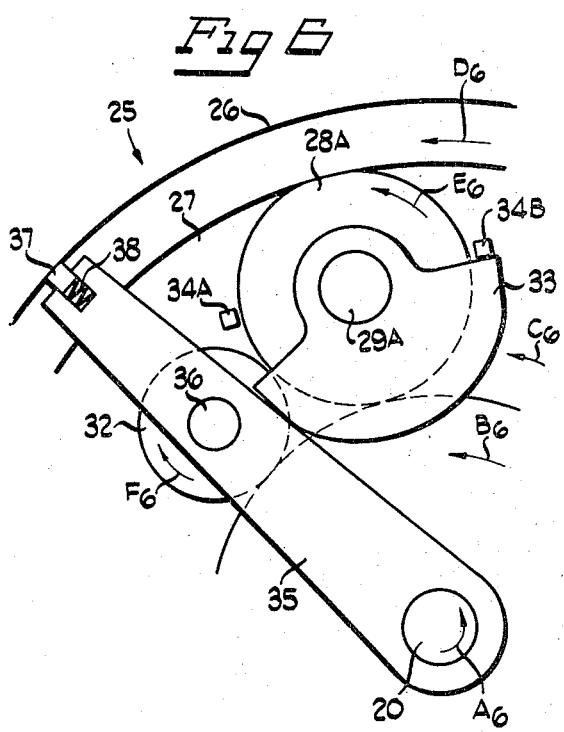
FIG. 6 is a top view in schematic of a portion of the differential mechanism showing the reverse lockup mode of operation.

FIG. 6 illustrates the differential mechanism 25 of the present invention immediately prior to its lockup condition when the vehicle is being driven in a reverse direction. In general, the operation of the differential mechanism is substantially the same as the operation described for the structure disclosed in FIG. 4.

The input shaft 20, planet carrier 27, sun gear 30, ring gear 31, planet gear 28 and locking gear 32 are rotating at the same angular speed as in FIG. 4 but in the opposite direction as indicated by arrows A6, B6, C6, D6, E6 and F6. When the ring gear 31 overspeeds the sun gear 30 the direction of rotation of the planet gear 28A will reverse from the clockwise direction shown in FIG. 5 to the counterclockwise direction as shown in FIG. 6. Since planet gear 28A and locking gear 32 are both in mesh with the sun gear 30 and are both rotating in opposite directions and the link 35 is being retarded against movement around the central axis of the input shaft 20, and since camming means 33 is rotated about the pin 29A, the gears 28 and 32 are urged into engagement and lock thereby preventing any further differentiation between sun gear 30 and ring gear 31. The planet carrier 27 continues to rotate at the same speed as prior to lockup but the sun and ring gear now also rotate at the same speed as do outputs 21 and 22.

For purposes of simplicity of explanation, the differential mechanism of the present invention has been illustrated as incorporating gears in a gear drive mechanism but it should be understood that any other type of rotary drive such as friction rollers could be substituted for the gear drive.

Figure 7:
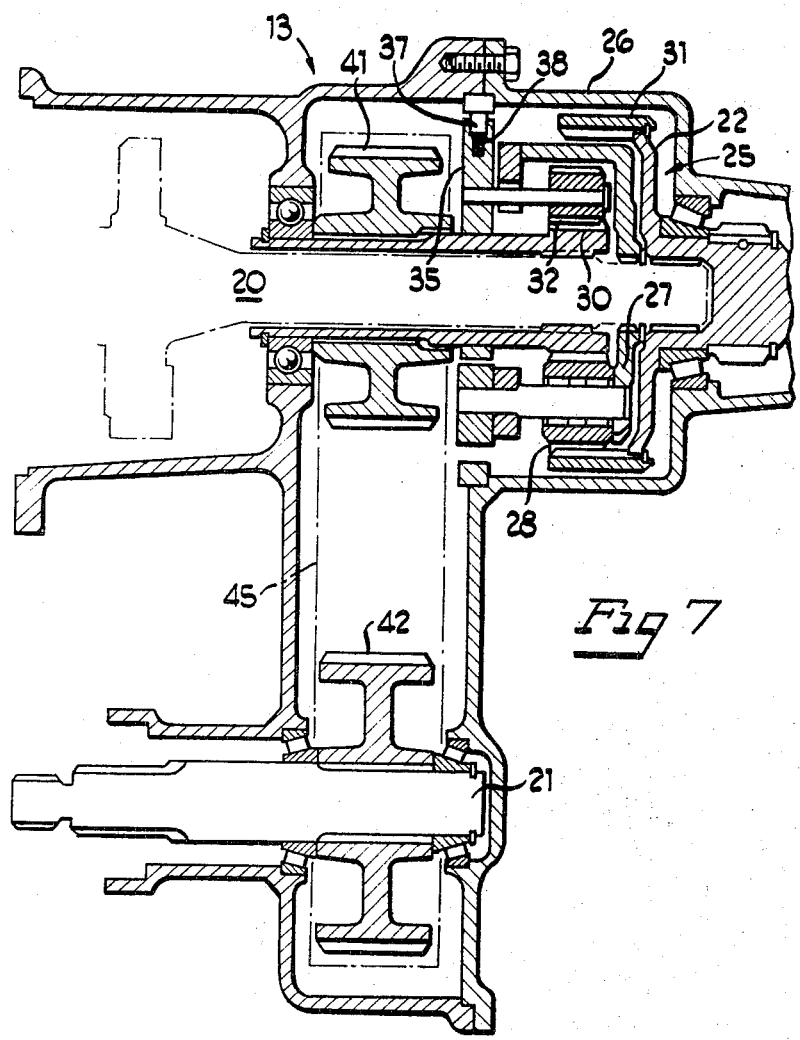
FIG. 7 is a side view in section of a torque transfer mechanism including the differential of the present invention.

FIG. 7 illustrates a torque transmitting mechanism 13 including the planetary differential of the present invention. The housing 26 serves as the housing for the entire torque transmitting mechanism 13.

Various features of the invention has been particularly shown and described in connection with the illustrated embodiments of the invention, however, it must be understood that these particular arrangements merely illustrate and that the invention is to be given its fullest interpretation within the terms of the appended claims.

What is claimed is:

1. A planetary differential including a planet carrier element, at least one planet gear carried by said carrier element, first and second gear elements meshed with said planet gear, an input means drivingly connected to one of said elements, means associated with said differential to provide for normal overspeed of one of said gear elements with respect to said other gear element, a locking gear meshing with one of said gear elements and adapted to mesh with said planet gear, camming means associated with said locking gear adapted to assume a first position effective to maintain said locking gear out of contact with said planet gear and a second position effective to allow said locking gear to engage said planet gear, whereby for normal overspeed of said one gear element with respect to said other gear element said blocking means assumes said first position and differentiation between said gear elements is permitted but when said normally underspeeding gear element overspeeds said normally overspeeding gear element said camming means assumes said second position to prevent differentiation between said gear elements.

2. A planetary differential as in claim 1 in which said camming means is rotatable about the central axis of said planet gear to assume said first and second positions.

3. A planetary differential as in claim 2 including a friction connection between said planet gear and said camming means.

4. A planetary differential as in claim 1 including a link carrying said locking gear.

5. A planetary differential as in claim 4 in which said link is rotatable about a central axis of said differential mechanism.

6. A planetary differential as in claim 5 including a friction connection between said link and a stationary element.

7. A planetary differential as in claim 6 in which said camming means when in said first position engages said link to maintain said locking gear and said planet gear out of engagement.

8. A planetary differential as in claim 5 in which said link retains said locking gear in meshing engagement with said gear element.

9. A planetary differential as in claim 3 including a pair of stops each of said stops adapted to limit the rotational travel of said camming means in one direction of rotation.

10. A planetary differential as in claim 9 in which said stops are carried by said planet carrier.

11. A multiple path drive system for a vehicle having at least two pairs of traction wheels including a pair of axle assemblies, a pair of torque transmitting members each connected to an axle assembly, a torque transfer mechanism comprising driven means adapted to receive an input torque, a planetary differential mechanism driven by said driven means including a planetary carrier element, at least one planet gear carried by said carrier element, first and second gear elements meshed with said planet gear, each of said gear elements connected to one of said torque transmitting members, means drivingly connecting said driven means to one of said elements, means associated with said multiple path drive system to provide for normal overspeed of one of said gear elements with respect to said other gear element, a locking gear meshing with one of said gear elements and adapted to mesh with said planet gear, camming means associated with said locking gear adapted to assume a first position effective to maintain said locking gear out of contact with said planet gear and a second position effective to allow said locking gear to engage said planet gear whereby for normal overspeed of said one gear element with respect to said other gear element said camming means assumes said first position and differentiation between said gear elements is permitted, but when said normally underspeeding gear element overspeeds said normally overspeeding gear element said camming means assumes said second position to prevent differentiation between said gear elements.

12. A multiple path drive system as in claim 11 in which said means for providing normal overspeed of said one gear element with respect to said other gear element includes a first differential mechanism having a ratio relationship and associated with one of said drive axle assemblies and a second differential mechanism having a ratio relationship associated with said other drive axle assembly, said ratio relationships of said first and second differential mechanism being unequal.

13. A torque transfer mechanism comprising a housing, an input shaft operable within said housing, a pair of output shafts operable within said housing, a planetary differential mechanism driven by said input shaft including a planet carrier element, at least one planet gear carried by said carrier element, first and second gear elements meshed with said planet gear, each of said gear elements connected to an output shaft, means associated with said torque transfer mechanism to provide for normal overspeed of one of said gear elements with respect to said other gear elements, a locking gear meshing with one of said gear elements and adapted to mesh with said planet gear, camming means associated with said locking gear adapted to assume a first position effective to maintain said locking gear out of contact with said planet gear and a second position effective to allow said locking gear to engage said planet gear whereby for normal overspeed of said one gear element with respect to said other gear element said camming means assumes said first position and differentiation between said gear elements is permitted but when said normally underspeeding element overspeeds said normally overspeeding gear element, said camming means assumes said second position to prevent differentiation between said gear elements.

14. A torque transfer mechanism as in claim 13 wherein one of said output shafts is concentric with said input shaft and said other of said output shafts is laterally offset with respect to said input shaft.

15. A planetary differential including a planet carrier element; a plurality of planet gears carried by said carrier element; a sun gear and a ring gear meshed with said planet gears; input means drivingly connected to said carrier element; means associated with said differential to provide for normal overspeed of said sun gear with respect to said ring gear; a locking gear meshing with said sun gear and adapted to mesh with said planet gear, a link carrying said locking gear and frictionally associated with a stationary element, camming means associated with said link adapted to assume a first position effective to maintain said locking gear out of contact with said planet gear and a second position effective to allow said locking gear to engage said planet gear, said camming means being rotatable about the central axis of said planet gear and frictionally connected thereto such that for normal overspeed of said sun gear with respect to said ring gear differentiation between said gear elements is permitted but actuable when said ring gear overspeeds said sun gear to cause engagement of said locking gear with said planet gear to prevent differentiation between said gear elements.

* * * * *

UNITED STATES PATENT OFFICE
CERTIFICATE OF CORRECTION

Patent No. 3,838,610      Dated  October 1, 1974

Inventor(s)   Mark J. Fogelberg

It is certified that error appears in the above-identified patent and that said Letters Patent are hereby corrected as shown below:

Column 7, line 26, "blocking" should read -- camming --.

Column 8, line 44, "elements" should read -- element --.

Signed and sealed this 11th day of February 1975.

(SEAL)
Attest:

RUTH C. MASON
Attesting Officer

C. MARSHALL DANN
Commissioner of Patents
and Trademarks